(12) United States Patent
Grogg et al.

(10) Patent No.: US 10,527,103 B2
(45) Date of Patent: Jan. 7, 2020

(54) SHAFT INTERLOCK

(71) Applicant: UNITED TECHNOLOGIES CORPORATION, Farmington, CT (US)

(72) Inventors: Gary L. Grogg, South Berwick, ME (US); Marshall Thayer, Waterboro, ME (US); Eric Charles Mundell, South Berwick, ME (US); Todd M. LaPierre, Middleton, NH (US); Garth J. Vdoviak, Readfield, ME (US)

(73) Assignee: United Technologies Corporation, Farmington, CT (US)

( * ) Notice: Subject to any disclaimer, the term of this patent is extended or adjusted under 35 U.S.C. 154(b) by 150 days.

(21) Appl. No.: 15/904,965

(22) Filed: Feb. 26, 2018

(65) Prior Publication Data

US 2018/0187724 A1 Jul. 5, 2018

Related U.S. Application Data

(60) Division of application No. 15/076,759, filed on Mar. 22, 2016, now Pat. No. 9,933,019, which is a continuation of application No. PCT/US2014/069072, filed on Dec. 8, 2014.

(60) Provisional application No. 61/919,545, filed on Dec. 20, 2013.

(51) Int. Cl.
*F16D 1/06* (2006.01)
*F16D 7/04* (2006.01)
*F16D 43/202* (2006.01)

(52) U.S. Cl.
CPC ............... *F16D 1/06* (2013.01); *F16D 7/048* (2013.01); *F16D 43/2028* (2013.01)

(58) Field of Classification Search
CPC .......................... F16D 43/2028; F16D 7/048
See application file for complete search history.

(56) References Cited

U.S. PATENT DOCUMENTS

| | | | |
|---|---|---|---|
| 4,102,154 A | 7/1978 | Dahlstrand, Jr. | |
| 4,155,019 A | 5/1979 | Weghaupt | |
| 5,020,648 A | 6/1991 | Bush | |
| 6,220,402 B1 | 4/2001 | Tsutsui | |

(Continued)

FOREIGN PATENT DOCUMENTS

| | | |
|---|---|---|
| CH | 432948 | 3/1967 |
| CN | 2136899 | 6/1993 |

(Continued)

OTHER PUBLICATIONS

EP Extended Search Report dated Dec. 22, 2016 on EP Application 14872572.4.

(Continued)

*Primary Examiner* — David R Morris
(74) *Attorney, Agent, or Firm* — Snell & Wilmer, L.L.P.

(57) ABSTRACT

A shaft interlock system may have an a interlocking piston that translates a movable locking apparatus configured to interface with a turbine shaft having a fixed locking apparatus. The movable locking apparatus may engage and disengage the fixed locking apparatus. When the movable locking apparatus is engaged with the fixed locking apparatus, the turbine shaft is only able to turn in one direction. When the movable locking apparatus is disengaged from the fixed locking apparatus, the turbine shaft is able to turn in both directions. In this way, a turbine shaft can be prevented from reverse rotation.

12 Claims, 7 Drawing Sheets

(56) References Cited

U.S. PATENT DOCUMENTS 8,312,792 B1 11/2012 Kochidomari
2012/0172174 A1 7/2012 Kopecek

FOREIGN PATENT DOCUMENTS

| DE | 19909751 | 9/1999 |
| DE | 10056954 | 5/2002 |
| EP | 0513673 | 11/1992 |
| EP | 0945637 | 9/1999 |
| EP | 2471709 | 7/2012 |

OTHER PUBLICATIONS

International Preliminary Report on Patentability dated Jun. 21, 2016 in Application No. PCT/US2014/069072.
USPTO; Pre-Interview First Office Action dated Jul. 27, 2017 in U.S. Appl. No. 15/076,759.
USPTO; First Action Interview Office Action dated Sep. 11, 2017 in U.S. Appl. No. 15/076,759.
USPTO; Notice of Allowance dated Dec. 13, 2017 in U.S. Appl. No. 15/076,759.
European Patent Office, European Office Action dated Mar. 3, 2018 in Application No. 14 872 572.4-1012.

SHAFT INTERLOCK

CROSS-REFERENCE TO RELATED APPLICATIONS

This application is a divisional of, and claims priority to, and the benefit of U.S. Ser. No. 15/076,759 filed on Mar. 22, 2016, and entitled "SHAFT INTERLOCK" which is a continuation of, and claims priority to and the benefit of, PCT/US2014/069072 filed on Dec. 8, 2014 and entitled "SHAFT INTERLOCK," which claims priority from U.S. Provisional Application No. 61/919,545 filed on Dec. 20, 2013 and entitled "SHAFT INTERLOCK." All three of the aforementioned applications are incorporated herein by reference in their entirety.

FIELD

The present disclosure relates to shaft interlocks, and more specifically, to anti-reverse shaft interlocks.

BACKGROUND

Turbine engines typically windmill when idle. Often, a turbine engine will windmill due to wind blowing through the engine. Many times, wind enters through the engine outlet, causing the engine to windmill in reverse. Many turbine engines do not have a feature to prevent the reverse wind milling of the engine or utilize a complex and/or heavy system to accomplish this feature. Moreover, forward wind milling is often desired, for example, to enable the engine to more readily restart in flight. Reverse wind milling is not desired, for example, to reduce wear on the engine when idle. A turbine engine typically has a system to facilitate lubrication of rotating components when idle, but often this system only lubricates the rotating components when the engine is forward wind milling. Thus, reverse wind milling is often not desired.

SUMMARY

A shaft interlock system is disclosed having an interlocking piston configured to translate a movable locking apparatus configured to interface with a turbine shaft having a fixed locking apparatus, a main body wherein the interlocking piston is at least partially disposed, an extension actuator disposed in the main body and in mechanical communication with the interlocking piston capable of exerting an extending force on the interlocking piston, and a retraction actuator disposed in the main body and in mechanical communication with the interlocking piston capable of exerting a retracting force on the interlocking piston. The movable locking apparatus may engage the fixed locking apparatus to permit the fixed locking apparatus and the movable locking apparatus to slip in the axial rotation domain in a first direction of rotation and preventing the fixed locking apparatus and the movable locking apparatus from slipping in the axial rotation domain in a second direction of rotation.

A method of operating a shaft interlock system is disclosed including retracting an interlocking piston having a movable locking apparatus mechanically engaged with a fixed locking apparatus of a turbine shaft by actuating a retraction actuator wherein the retracting includes inducing pressurized oil to flow into a channel of a main body of the shaft interlock system, conducting the pressurized oil through the channel and filling a cylinder in the main body whereby the pressurized oil exerts a force on the interlocking piston, moving the interlocking piston inward to the main body in response to the force, mechanically disengaging the movable locking apparatus from the fixed locking apparatus of a turbine shaft, permitting the turbine shaft to rotate in either direction in response to the mechanical disengaging, extending the interlocking piston wherein the extending includes causing an extension apparatus to exert a force on the interlocking piston, moving the interlocking piston outward from the main body in response to the force, mechanically engaging the movable locking apparatus with the fixed locking apparatus of the turbine shaft, preventing the turbine shaft from rotating in one direction in response to the mechanically engaging.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
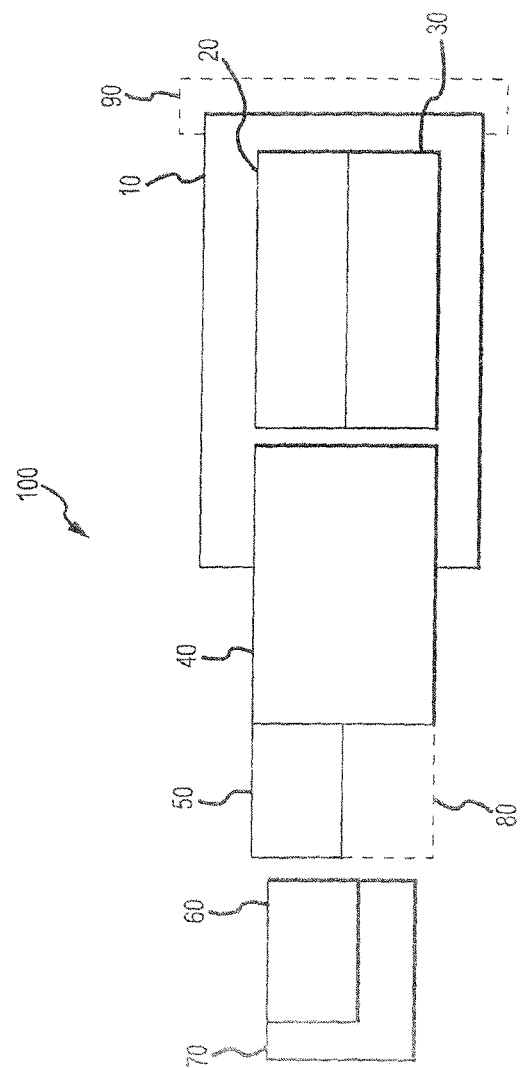
FIG. 1 illustrates a block diagram illustrating various functional relationships of a shaft interlock system according to various embodiments.
Figure 2:
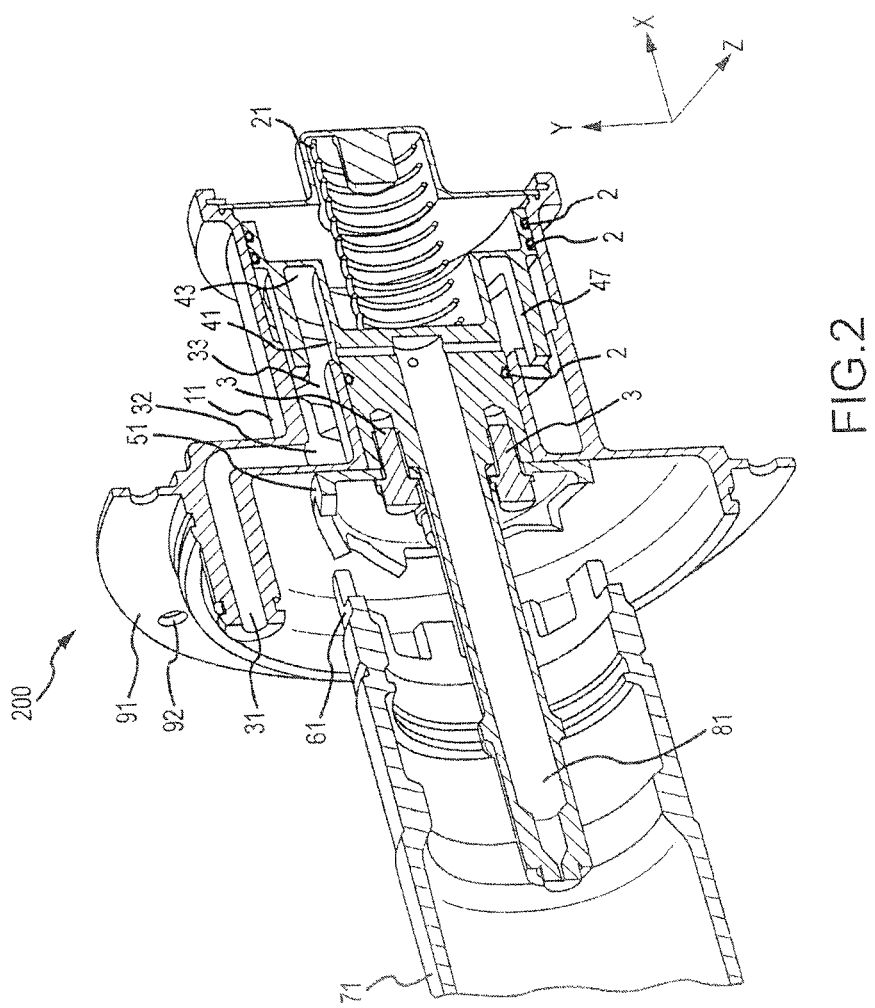
FIG. 2 illustrates various aspects of a horizontally disposed shaft interlock system in the unlocked configuration according to various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, a shaft interlock system comprises a turbine shaft comprising a fixed locking apparatus, an interlocking piston comprising a movable locking apparatus, a main body, an extension actuator, a retraction actuator, and a mounting apparatus. For example, with reference to FIG. 1, various functional relationships of an example shaft interlock system 100 are illustrated. A turbine shaft 70 may comprise a fixed locking apparatus 60. An interlocking piston 40 may comprise a movable locking apparatus 50. Fixed locking apparatus 60 may be adapted to interlock in mechanical communication with movable locking apparatus 50. Main body 10 may be mounted in fixed physical position with respect to surrounding hardware by mounting apparatus 90. An extension actuator 20 and a retraction actuator 30 may be disposed substantially within main body 10. In various embodiments, extension actuator 20 is adapted to exert an extension force on interlocking piston 40 whereby interlocking piston 40 may be mechanically translated partially out of main body 10 and toward fixed locking apparatus 60. In various embodiments, retraction actuator 30 may be adapted to exert a retracting force on interlocking piston 40 whereby interlocking piston 40 may be mechanically translated partially in to main body 10 and away from fixed locking apparatus 60. In this regard, interlocking piston 40 may be articulated toward or away from main body 10 and thus, away from or toward turbine shaft 70, respectively. Interlocking piston 40 may comprise a movable locking apparatus 50 disposed at its end. Accordingly, movable locking apparatus 50 may be translated toward or away from fixed locking apparatus 60 of turbine shaft 70 and may engage in mechanical communication with fixed locking apparatus 60.

Having described various functional relationships of a shaft interlock system, with reference to FIGS. 2-5, in accordance with various embodiments, a shaft interlock system 200 may comprise a turbine shaft 71 comprising a fixed locking apparatus 61, an interlocking piston 41 comprising a movable locking apparatus 51, a main body 11, an extension actuator 21, a retraction actuator 31, and a mounting apparatus 91. Moreover, interlocking piston 41 may further comprise a cooling wand 81.

In various embodiments, a turbine shaft may comprise a spinning shaft. In various embodiments, a turbine shaft is axially traversed by a hollow channel through which oil is conveyed. As will be discussed further herein, a cooling wand 81 may extend axially into this hollow channel through an aperture in the turbine shaft. A turbine shaft 71 may further comprise a fixed locking apparatus 61. In various embodiments, fixed locking apparatus 61 is configured to mechanically interface with a movable locking apparatus 51.

In various embodiments, fixed locking apparatus 61 may comprise a castellated ring. For example, a fixed locking apparatus 61 may comprise a series of teeth disposed circumferentially about an end of turbine shaft 71 and extending axially from the end of the turbine shaft 71 in a circular plane of the surface of the turbine shaft. In various embodiments, the teeth may comprise quadrilateral shapes, for example, square, trapezoidal or rectangular teeth. In various embodiments, the teeth may comprise triangular shapes, for example saw tooth shapes and/or right-triangle shapes.

In various embodiments, a main body 11 of a shaft interlock system 200 may be mounted to an existing structure disposed in front of (in the positive X direction) the turbine shaft 71. For example, a main body 11 may comprise a mounting apparatus 91 adapted to mechanically interface with an existing structure via fastener apertures 92. Main body 11 may comprise a body having an extension actuator 21 and a retraction actuator 31 disposed therein and interfaced in mechanical communication with interlocking piston 41. In this regard, interlocking piston may be translated toward and away from turbine shaft 71 so that movable locking apparatus 51 may engage and disengage from fixed locking apparatus 61.

In various embodiments, extension actuator 21 may comprise a compressed helical spring positioned to exert a force in the negative X axis against interlocking piston 41. In various embodiments, retraction actuator 31 may comprise an oil channel 32 and cylinder 33 through which oil may enter the main body 11 and exert a hydraulic force on interlocking piston 41. In various embodiments, this hydraulic force overcomes the force exerted by extension actuator 21 and causes the interlocking piston 41 to translate in the positive X axis direction, thereby disengaging movable locking apparatus 51 from fixed locking apparatus 61. As a result, when retraction actuator 31 is deactivated, for example, when the oil supply is terminated, interlocking piston 41 may translate toward turbine shaft 71 so that movable locking apparatus 51 engages fixed locking apparatus 61. Interlocking piston 41 may retract away from turbine shaft 71 so that movable locking apparatus 51 disengages fixed locking apparatus 61 when retraction actuator 31 is activated, for example, when the oil supply is active. In various embodiments, extension actuator 21 exerts 30 to 70 lbs. (~133 to ~312 N), for example, 50 lbs. (~223 N) of force on interlocking piston 41. In various embodiments, retraction actuator 31 exerts 130 to 170 lbs. (~578 N to ~757 N), for example, 150 lbs. (~668 N) of force on interlocking piston 41. However, any force may be selected wherein the force exerted by extension actuator 21 is less than the force exerted by retraction actuator 31.

In various embodiments, interlocking piston 41 comprises a shaft 42 extending in the X axis direction and a pressure plate 43 disposed at the end of the shaft within the main body 11. The pressure plate 43 may comprise a circular plate comprising an annular portion disposed in the Y-Z plane within the main body 11. Interlocking piston 41 may further comprise O-rings 2. O-rings 2 may seal the interface between interlocking piston 41 and main body 11. Retraction actuator 31 may exert force on the pressure plate 43 thereby translating the interlocking piston 41 along the X axis in accordance with the principles discussed herein.

In various embodiments, interlocking piston 41 mechanically interfaces with a movable locking apparatus 51. In various embodiments, movable locking apparatus 51 is connected to interlocking piston 41 via fasteners 3. In various embodiments, fasteners 3 comprise bolts, although fasteners 3 may also comprise nuts, screws, pins, welds, or any form of permanent or detachable bonding.

In various embodiments, interlocking piston 41 further comprises a cooling wand 81 extending axially through an aperture in turbine shaft 71 into a hollow channel within turbine shaft 71. Lubricating oil may be conveyed from main body 11 through cooling wand 81 and introduced into turbine shaft 71. In various embodiments, turbine shaft 71 conveys this lubricating oil to other components via a hollow channel within the turbine shaft 71. Lubricating oil introduced via cooling wand 81 may cool various components of the shaft interlock system.

In various embodiments, movable locking apparatus 51 may comprise a series of teeth disposed circumferentially about an end of interlocking piston 41 and extending axially from the end of the interlocking piston 41 in a circular plane of the surface of the fixed locking apparatus 61. In this manner, movable locking apparatus 51 may mechanically engage and disengage from fixed locking apparatus 61. For example, in various embodiments, movable locking apparatus 51 comprises a castellated ring. In various embodiments, the teeth may comprise triangular shapes, for example saw tooth shapes, or right-triangle shapes. In various embodiments, the teeth may comprise quadrilateral shapes, for example, square, trapezoidal or rectangular teeth. The teeth of movable locking apparatus 51 may engage with fixed locking apparatus 61 in such a manner as to permit fixed locking apparatus 61 and movable locking apparatus 51 to slip in the axial rotation domain, when rotated in one direction, for example when fixed locking apparatus 61 rotates counter clockwise, and to not slip, but to interface rigidly in the axial rotation domain, when rotated in the other direction, for example when fixed locking apparatus 61 rotates clockwise. As a result, turbine shaft 71 may be permitted to rotate in one direction, for example, counter clockwise, but prevented from rotating in the other direction, for example clockwise, whenever movable locking apparatus 51 is mechanically interfaced with fixed locking apparatus 61.

In various embodiments, movable locking apparatus 51 and fixed locking apparatus 61 comprise corresponding teeth. For example, mirror image teeth which interlock with one another. In various embodiments, however, movable locking apparatus 51 and fixed locking apparatus 61 comprise different teeth, for example, fixed locking apparatus 61 may comprise trapezoidal teeth and movable locking apparatus 51 may comprise right-triangle teeth designed to fit into the channels between the trapezoidal teeth of fixed locking apparatus 61. Furthermore, in various embodiments, movable locking apparatus 51 and fixed locking apparatus 61 may comprise identical teeth wherein the grooves and channels correspond and interlock. Still furthermore, in various embodiments, movable locking apparatus 51 and fixed locking apparatus 61 may comprise clutch faces, or any other apparatus by which axial rotation force may be transmitted such that fixed locking apparatus 61 is adapted to engage with turbine shaft 71 and prevent rotation in a first direction while allowing rotation in a second direction (e.g., allowing clockwise rotation while preventing counter-clockwise rotation).

In various embodiments, interlocking piston 41 comprises anti-rotation tabs 47. An anti-rotation tab comprises a finger-like extension extending from the interlocking piston into a corresponding cavity in main body 11. As movable locking apparatus 51 mechanically engages with fixed locking apparatus 61, fixed locking apparatus 61 may conduct rotational force from turbine shaft 71, into movable locking apparatus 51 and movable locking apparatus 51 may conduct rotational force into interlocking piston 41. Anti-rotation tabs 47 conduct this force from interlocking piston 41 into main body 11 and prevent interlocking piston 41 from rotating in response to the force. In various embodiments, a shaft interlock system 200 comprises two anti-rotation tabs 47, though shaft interlock system 200 may comprise any number of anti-rotation tabs 47 sufficient to withstand a given magnitude and impulse of force. In various embodiments, anti-rotation tabs 47 comprise finger-like extensions extending from the interlocking piston, but anti-rotation tabs may comprise flanges, ridges, spline grooves, or any other apparatus configured to prevent interlocking piston 41 from rotating.

In various embodiments, a shaft interlock system 200 may have a disengaged state and an engaged state. For example, with reference to FIGS. 2 and 4, a shaft interlock system 200 is illustrated in the disengaged state in accordance with various embodiments. Movable locking apparatus 51 is mechanically disconnected from fixed locking apparatus 61. Interlocking piston 41 resides in a fully-retracted position, wherein the interlocking piston is translated to its farthest position in the positive X axis direction. In this state, the force exerted by retraction actuator 31 exceeds the force exerted by extension actuator 21. For example, if no oil is introduced into retraction actuator 31, then no hydraulic pressure acts on interlocking piston 41 to impel it to extend. However, retraction actuator 31 may comprise a spring, thus the retraction actuator 31 may maintain a force in the positive X direction on interlocking piston 41.

Figure 3:
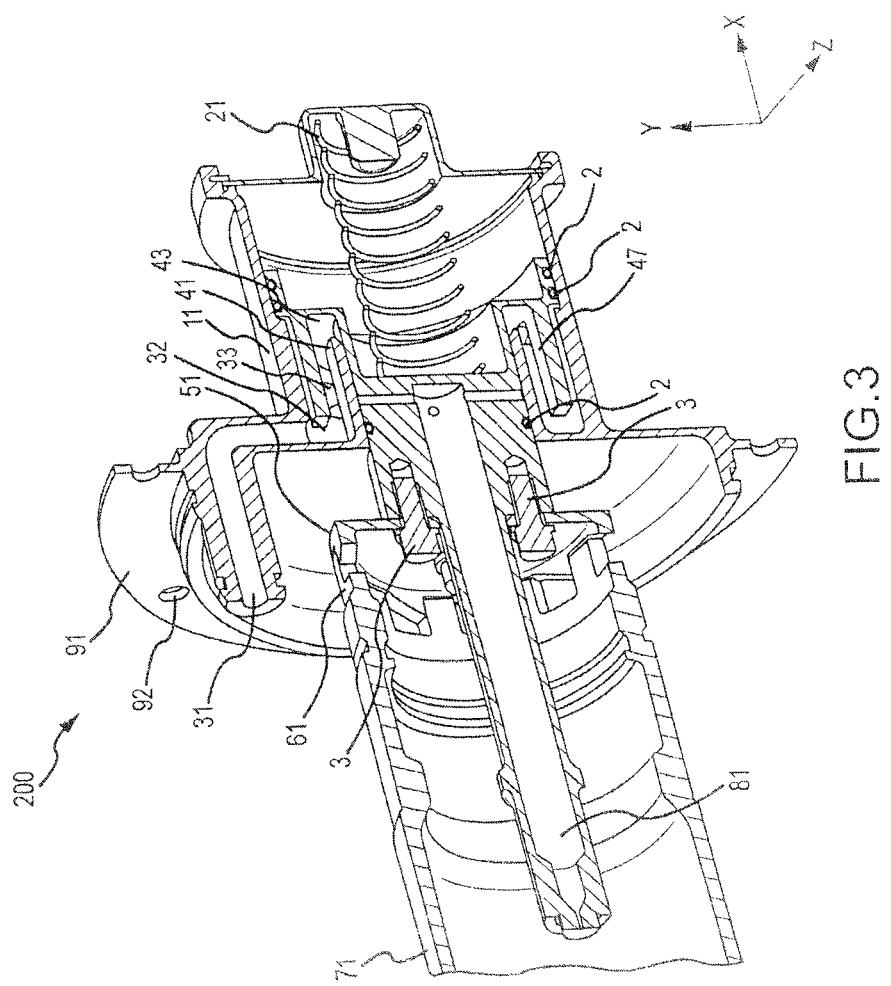
FIG. 3 illustrates various aspects of a horizontally disposed shaft interlock system in the locked configuration according to various embodiments.
Figure 4:
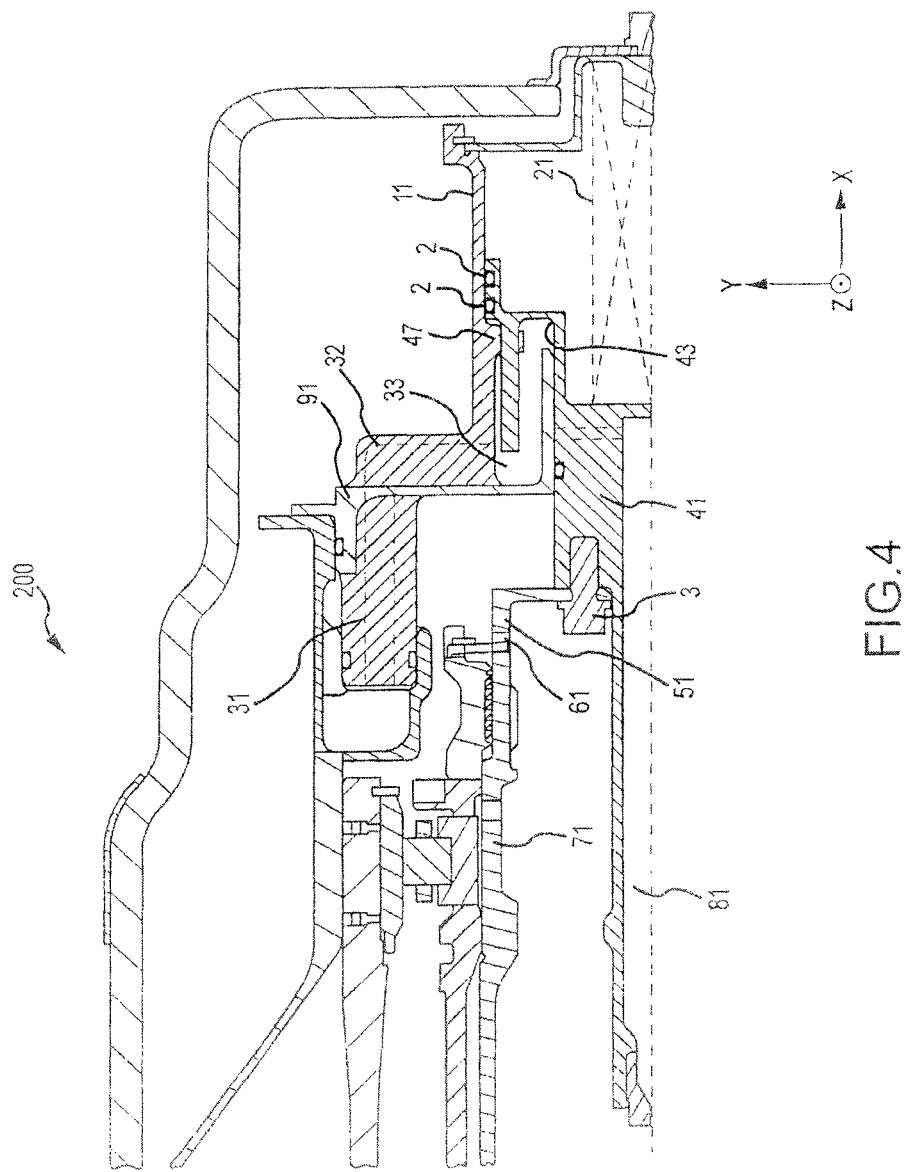
FIG. 4 illustrates various aspects of a horizontally disposed shaft interlock system and various surrounding hardware in the unlocked configuration according to various embodiments.
Figure 5:
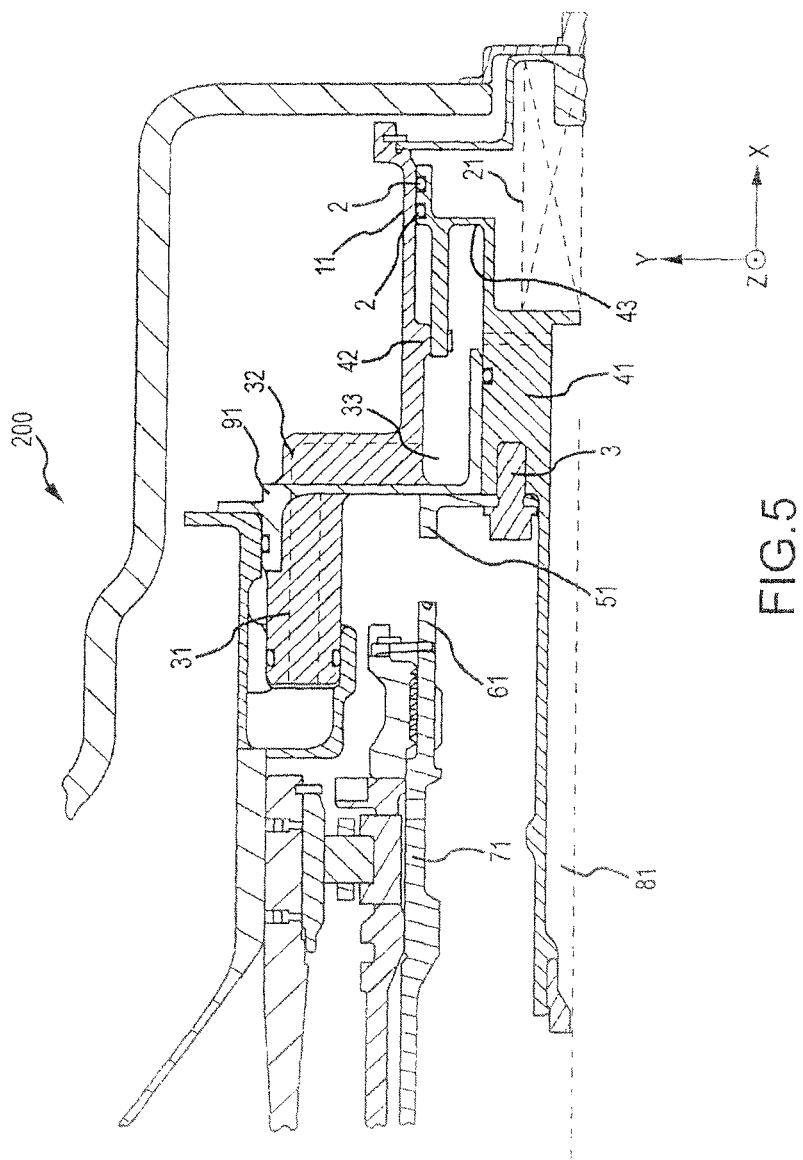
FIG. 5 illustrates various aspects of a horizontally disposed shaft interlock system and various surrounding hardware in the locked configuration according to various embodiments.

Now, with reference to FIGS. 3 and 5, a shaft interlock system 200 is illustrated in the engaged state. A movable locking apparatus 51 is mechanically connected to fixed locking apparatus 61. Interlocking piston 41 is in a fully-extended position, wherein the interlocking piston is translated to its farthest position in the negative X axis direction. In this state, the force exerted by retraction actuator 31 is overcome by the force exerted by extension actuator 21. For example, if oil is introduced into retraction actuator 31 under pressure, then hydraulic pressure acts on interlocking piston 41 to impel it to retract. Although retraction actuator 31 may comprise a spring, thus maintaining a force in the positive X direction on interlocking piston 41, as long as sufficiently pressurized oil is introduced into retraction actuator 31, this spring force may be overcome. In various embodiments, extension actuator 21 exerts 30 to 70 lbs. (~133 to ~312 N), for example, 50 lbs. (~223 N) of force on interlocking piston 41. In various embodiments, retraction actuator 31 exerts 130 to 170 lbs. (~578 N to ~757 N), for example, 150 lbs. (~668 N) of force on interlocking piston 41. However, any force may be selected wherein the force exerted by extension actuator 21 is less than the force exerted by retraction actuator 31. In this manner, if the oil supply fails, for example, upon turbine shutdown, the interlocking piston 41 extends so that movable locking apparatus 51 engages fixed locking apparatus 61 and rotation of the shaft is prevented in one direction and allowed in the other direction.

Figure 6:
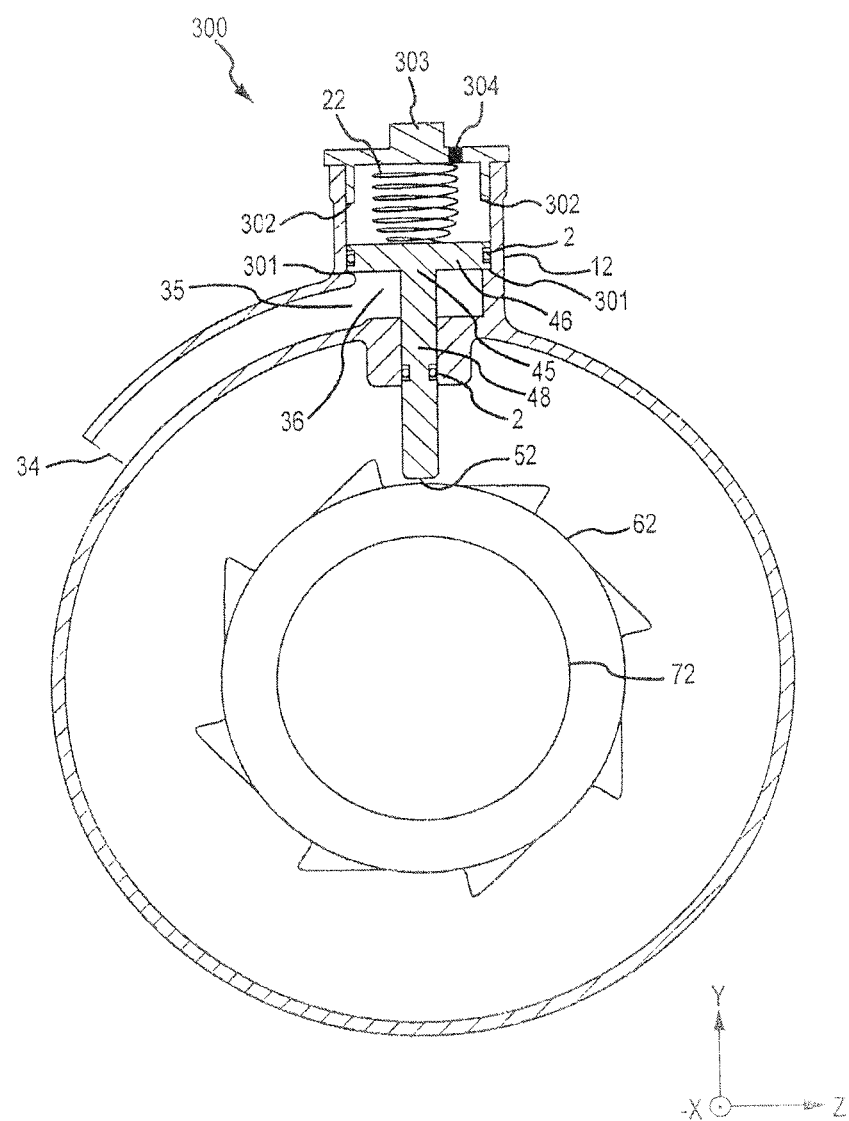
FIG. 6 illustrates various aspects of a vertically disposed shaft interlock system and various surrounding hardware in the unlocked configuration according to various embodiments.

Now with reference to FIG. 6, a shaft interlock system 300 is illustrated according to various embodiments. In accordance with various embodiments, a shaft interlock system 300 may comprise a turbine shaft 72 comprising a fixed locking apparatus 62, an interlocking piston 45 comprising a movable locking apparatus 52, a main body 12, an extension actuator 22, and a retraction actuator 34.

In various embodiments, a turbine shaft may comprise a spinning shaft. In various embodiments, a turbine shaft 72 may further comprise a fixed locking apparatus 62. In various embodiments, fixed locking apparatus 62 is configured to mechanically interface with a movable locking apparatus 52.

In various embodiments, fixed locking apparatus 62 may comprise a series of teeth disposed about a circumference of turbine shaft 72 and extending radially from the circumference of the turbine shaft 72. In various embodiments, the teeth may comprise quadrilateral shapes, for example, square, trapezoidal or rectangular teeth. In various embodiments, the teeth comprise triangular shapes, for example saw tooth shapes and/or right-triangle shape.

In various embodiments, a main body 12 of a shaft interlock system 300 may be mounted to an existing structure disposed in front of (in the positive X direction) the turbine shaft 72. For example, a main body 12 may comprise an integral mounting apparatus (90; FIG. 1) adapted to mechanically interface with an existing structure. In various embodiments, this integral mounting apparatus comprises the integration of main body 12 into other bulkheads, or engine features.

Main body 12 may comprise a body having an extension actuator 22 and a retraction actuator 34 disposed therein and interfaced in mechanical communication with interlocking piston 45. In this regard, interlocking piston may be translated toward and away from turbine shaft 72 so that movable locking apparatus 52 may engage and disengage from fixed locking apparatus 62.

In various embodiments, extension actuator 22 may comprise a compressed helical spring positioned to exert a force in the positive Y axis against interlocking piston 45. In various embodiments, retraction actuator 34 may comprise an oil channel 35 and cylinder 36 through which oil may enter the main body 12 and exert a hydraulic force on interlocking piston 45. In various embodiments, this hydraulic force overcomes the force exerted by extension actuator 22 and causes the interlocking piston 45 to translate in the positive Y axis direction, thereby disengaging movable locking apparatus 52 from fixed locking apparatus 62. As a result, interlocking piston 45 may extend toward turbine shaft 72 so that movable locking apparatus 52 engages fixed locking apparatus 62 when retraction actuator 34 is deactivated, for example, when the oil supply is terminated. Interlocking piston 45 may retract away from turbine shaft 72 so that movable locking apparatus 52 disengages fixed locking apparatus 62 when retraction actuator 34 is activated, for example, when the oil supply is active. In various embodiments, extension actuator 22 exerts 30 to 70 lbs. (~133 to ~312 N), for example, 50 lbs. (~223 N) of force on interlocking piston 45. In various embodiments, retraction actuator 34 exerts 130 to 170 lbs. (~578 N to ~757 N), for example, 150 lbs. (~668 N) of force on interlocking piston 45. However, any force may be selected wherein the force exerted by extension actuator 22 is less than the force exerted by retraction actuator 34.

In various embodiments, interlocking piston 45 comprises a cylindrical shaft 48 extending in the Y axis direction and a pressure plate 46 disposed at the end of the shaft within the main body 12. The pressure plate 46 may comprise a circular plate comprising an annular portion disposed in the X-Z plane within the main body 12. Interlocking piston 45 may further comprise O-rings 2. O-rings 2 may seal the interface between interlocking piston 45 and main body 12. Extension actuator 22 and retraction actuator 34 may exert extending and retracting force on the circular plate portion thereby translating the cylindrical shaft portion of interlocking piston 42 along the Y axis.

In various embodiments, interlocking piston 45 mechanically interfaces with a movable locking apparatus 52. In various embodiments, movable locking apparatus 52 is an integral tip of interlocking piston 45, In various embodiments, movable locking apparatus 52

In various embodiments, movable locking apparatus 52 may comprise an integral tip having a chamfered circumferential edge at the end of interlocking piston 45 and extending radially into the plane of rotation through which fixed locking apparatus 62 rotates. In this manner, movable locking apparatus 52 may mechanically engage and disengage from fixed locking apparatus 62. For example, in various embodiments, fixed locking apparatus 62 comprises a series of ramped teeth. In various embodiments, the teeth comprise triangular shapes, for example saw tooth shapes and/or right-triangle shapes. In this manner, teeth may engage with movable locking apparatus 52 in such a manner as to permit fixed locking apparatus 62 and movable locking apparatus 52 to slip in the axial rotation domain, when rotated in one direction, for example within fixed locking apparatus 62 rotates counter clockwise, and to not slip, but to interface rigidly in the axial rotation domain, when rotated in the other direction, for example when fixed locking apparatus 62 rotates clockwise. As a result, turbine shaft 71 may be permitted to rotate in a first direction, for example, counter clockwise, but prevented from rotating in a second direction, for example clockwise, whenever movable locking apparatus 52 is mechanically interfaced with fixed locking apparatus 62.

In various embodiments, as movable locking apparatus 52 mechanically engages with fixed locking apparatus 62, fixed locking apparatus 62 may conduct rotational force from turbine shaft 72, into movable locking apparatus 52 and movable locking apparatus 52 may conduct rotational force into interlocking piston 45. Interlocking piston 45 may conduct this force from interlocking piston 45 into main body 12 and prevent interlocking piston 45 from twisting in response to the force.

In various embodiments, a shaft interlock system 300 may have a disengaged state and an engaged state. With reference to FIG. 6, a shaft interlock system 300 is illustrated in the engaged state. A movable locking apparatus 52 is interfaced in mechanical communication with fixed locking apparatus 62. Interlocking piston 45 is in a fully-extended position, wherein the interlocking piston is translated to its farthest position in the negative Y axis direction. In this state, the force exerted by retraction actuator 34 is overcome by the force exerted by extension actuator 22. For example, no oil or oil having insufficient hydraulic pressure to impel interlocking piston 42 to retract, is introduced into retraction actuator 34.

Moreover, the shaft interlock system 300 may enter a disengaged state. In this state, the force exerted by retraction actuator 34 overcomes the force exerted by extension actuator 22. For example, oil having sufficient hydraulic pressure to impel interlocking piston 42 to retract is introduced into retraction actuator 34. Extension actuator 22 may comprise a spring, thus maintaining a force in the positive X direction on interlocking piston 45; however, as long as sufficiently pressurized oil is introduced into retraction actuator 34, this spring force may be overcome. In various embodiments, extension actuator 22 exerts 30 to 70 lbs. (~133 to ~312 N), for example, 50 lbs. (~223 N) of force on interlocking piston 45. In various embodiments, retraction actuator 34 exerts 130 to 170 lbs. (~578 N to ~757 N), for example, 150 lbs. (~668 N) of force on interlocking piston 45. However, any force may be selected wherein the force exerted by extension actuator 22 is less than the force exerted by retraction actuator 34 when sufficient pressurized oil is introduced into retraction actuator 34. In this manner, if the oil supply fails, for example, upon turbine shutdown, the interlocking piston 45 extends so that movable locking apparatus 52 engages fixed locking apparatus 62 and rotation of the shaft is prevented in one direction and allowed in the other direction.

In various embodiments, main body 12 further comprises an extension stop 301, though main body 12 may comprise any number of extension stops 301 adapted to limit the travel of interlocking piston 45. Extension stop 301 comprises a ledge disposed within the cylinder 33 of main body 12 in which interlocking piston 45 travels. In this manner, the maximal extension of the interlocking piston 45 may be set, and thus the maximal approach of movable locking apparatus 52 to fixed locking apparatus 62 may be established. In various embodiments, the position of extension stop 301 is selected to prevent movable locking apparatus 52 from extending in the negative Y direction to ride against fixed locking apparatus 62. In this manner, movable locking apparatus 52 may only contact fixed locking apparatus 62 when a tooth section of fixed locking apparatus 62 interferes with movable locking apparatus 52, for example, though rotation. In this manner, when turbine shaft 72 (and thus fixed locking apparatus 62) is rotating in the direction that rotation is desired to be permitted, even if interlocking piston 45 is in its fully-extended position, interlocking piston 42 does not continuously contact fixed locking apparatus 62.

In various embodiments, main body 12 further comprises a retraction stop 302, though main body 12 may comprise any number of retraction stops 302 adapted to limit the travel of interlocking piston 45. Retraction stop 302 comprises a ledge disposed within the cylinder 33 of main body 12 in which interlocking piston 45 travels. In this manner, the maximal retraction of the interlocking piston 45 may be set, and thus the maximal retraction of interlocking piston 45 into the main body may be established, in this regard, wear on the extension actuator 22 may be ameliorated by limiting the force transferred to extension actuator 22 when interlocking piston 45 is in the fully-retracted position.

In various embodiments, main body 12 further comprises a cap 303. In various embodiments, cap 303 is a removable cap enclosing the cylinder 33 of main body 12 in which interlocking piston 45 resides. Cap 303 may be removable, for example, to replace components of extension actuator 22. Moreover, cap 303 may comprise a vent 304. Vent 304 may provide a release mechanism for oil introduced into retraction actuator 34. In this regard, overpressure situations may be ameliorated through the venting of hydraulic pressure from retraction actuator 34.

Figure 7:
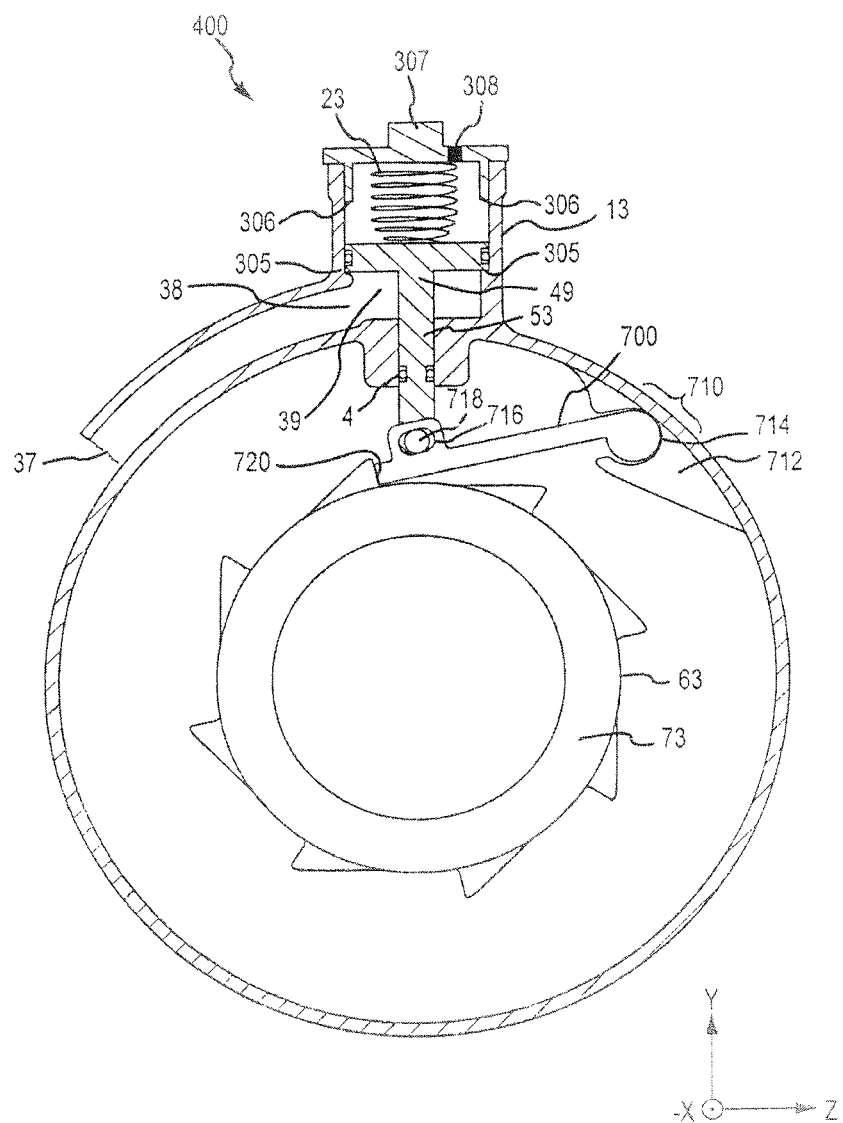
FIG. 7 illustrates various aspects of a vertically disposed shaft interlock system having a rocker arm and various surrounding hardware in the unlocked configuration according to various embodiments.

Now with reference to FIG. 7, a shaft interlock system 400 is illustrated according to various embodiments. In accordance with various embodiments, a shaft interlock system 400 may comprise a turbine shaft 73 comprising a fixed locking apparatus 63, an interlocking piston 49 comprising a rocker arm attachment aperture 716, a rocker arm 700 comprising a moveable locking apparatus 720, a main body 13, a main body retention apparatus 710, an extension actuator 23, and a retraction actuator 37.

In various embodiments, a turbine shaft may comprise a spinning shaft. In various embodiments, a turbine shaft 73 may further comprise a fixed locking apparatus 63. In various embodiments, fixed locking apparatus 63 is configured to mechanically interface with moveable locking apparatus 720.

In various embodiments, fixed locking apparatus 63 may comprise a series of teeth disposed about a circumference of turbine shaft 73 and extending radially from the circumference of the turbine shaft 73. In various embodiments, the teeth may comprise quadrilateral shapes, for example, square, trapezoidal or rectangular teeth. In various embodiments, the teeth comprise triangular shapes, for example saw tooth shapes and/or right-triangle shape.

In various embodiments, a main body 13 of a shaft interlock system 400 may be mounted to an existing structure disposed in front of (in the positive X direction) the turbine shaft 73. For example, a main body 13 may comprise an integral mounting apparatus (90; FIG. 1) adapted to mechanically interface with an existing structure. In various embodiments, this integral mounting apparatus comprises the integration of main body 13 into other bulkheads, or engine features.

Main body 13 may comprise a body having an extension actuator 23 and a retraction actuator 37 disposed therein and interfaced in mechanical communication with interlocking piston 49. In this regard, interlocking piston may be translated toward and away from turbine shaft 73 so that rocker arm 700 is translated such that movable locking apparatus 720 is may engage and disengage from fixed locking apparatus 63.

In various embodiments, extension actuator 23 may comprise a compressed helical spring positioned to exert a force in the positive Y axis against interlocking piston 49. In various embodiments, retraction actuator 37 may comprise an oil channel 38 and cylinder 39 through which oil may enter the main body 13 and exert a hydraulic force on interlocking piston 49. In various embodiments, this hydraulic force overcomes the force exerted by extension actuator 23 and causes the interlocking piston 49 to translate in the positive Y axis direction, thereby disengaging movable locking apparatus 720 from fixed locking apparatus 63. As a result, interlocking piston 49 may extend toward turbine shaft 73 so that movable locking apparatus 720 engages fixed locking apparatus 63 when retraction actuator 37 is deactivated, for example, when the oil supply is terminated. Interlocking piston 49 may retract away from turbine shaft 73 so that movable locking apparatus 720 disengages fixed locking apparatus 63 when retraction actuator 37 is activated, for example, when the oil supply is active. In various embodiments, extension actuator 23 exerts 30 to 70 lbs. (~133 to ~312 N), for example, 50 lbs. (~223 N) of force on interlocking piston 49. In various embodiments, retraction actuator 37 exerts 130 to 170 lbs. (~578 N to ~757 N), for example, 150 lbs. (~668 N) of force on interlocking piston 49. However, any force may be selected wherein the force exerted by extension actuator 23 is less than the force exerted by retraction actuator 37.

In various embodiments, interlocking piston 49 comprises a cylindrical shaft 53 extending in the Y axis direction and a pressure plate 54 disposed at the end of the shaft within the main body 13. The pressure plate 54 may comprise a circular plate comprising an annular portion disposed in the X-Z plane within the main body 13. Interlocking piston 49 may further comprise O-rings 4. O-rings 4 may seal the interface between interlocking piston 49 and main body 13. Extension actuator 23 and retraction actuator 37 may exert extending and retracting force on the circular plate portion thereby translating the cylindrical shaft portion of interlocking piston 42 along the Y axis.

In various embodiments, interlocking piston 49 mechanically interfaces with rocker arm 700. In accordance with various embodiments, rocker arm 700 comprises an attachment pin 718 and interlocking piston 49 comprises a rocker arm attachment aperture 716. In various embodiments, attachment pin 718 extends through rocker arm attachment aperture 716 whereby the rocker arm is retained in mechanical communication with interlocking piston 49 yet permitted to rotate about an axis provided by pin 718 and rocker arm attachment aperture 716. In various embodiments, rocker arm attachment aperture 716 is an aperture larger than pin 718, for example, oval shape, or any other shape whereby pin 718 may slidably ride in the aperture so that rocker arm 700 may smoothly articulate without undue tension. For example, as discussed further herein, rocker arm 700 may be attached to main body 13 by main body retention apparatus 710 so that rocker arm 700 rotates axially about a substantially fixed spatial location in the main body retention apparatus 710. In such an embodiment, attachment aperture 716 may be implemented to permit some slidable motion to enable sufficient range of articulation of rocker arm 700.

In various embodiments, rocker arm 700 is connected at one end to interlocking piston 49, for example via rocker arm attachment aperture 716 and attachment pin 718. In various embodiments, attachment pin 718 may comprise a pin, a clip, a detent, or any other mechanism by which rocker arm 700 may be retained in mechanical communication with interlocking piston 49, yet permitted to articulate to mechanically engage and disengage from fixed locking apparatus 63.

In various embodiments, main body 13 may comprise a main body retention apparatus 710 so that the rocker arm 700 rotates axially about a fixed point in the main body retention apparatus 710. Main body retention apparatus 710 may comprise a thickened portion 712 of main body 13 wherein an aperture permits a portion rocker arm 700 to fit in mechanical communication. For example, rocker arm 700 may further comprise a main body retention tab 714. Main body retention tab 714 may be a portion of rocker arm 700 having a cross section substantially resembling a circle. In this manner, main body retention tab 714 may be reposed within an aperture of the thickened portion 712 of main body 13. In this manner, main body retention apparatus 710 may retain the rocker arm in mechanical communication with main body 13. Furthermore, in this manner, compression forces exerted on rocker arm 700 by fixed locking apparatus 63 may be transmitted to main body 13. Furthermore, in various embodiments, main body retention apparatus 710 may comprise a aperture, a pin, a clip, a detent, or any other mechanism by which rocker arm 700 may be retained in mechanical communication with main body 13, yet permitted to rotate.

In various embodiments, movable locking apparatus 720 may comprise an integral tip having a chamfered circumferential edge at the end of rocker arm 700 and extending into the plane of rotation through which fixed locking apparatus 63 rotates. In this manner, movable locking apparatus 720 may mechanically engage and disengage from fixed locking apparatus 63. For example, in various embodiments, fixed locking apparatus 63 comprises a series of ramped teeth. In various embodiments, the teeth comprise triangular shapes, for example saw tooth shapes and/or right-triangle shapes. In this manner, teeth may engage with movable locking apparatus 720 in such a manner as to permit fixed locking apparatus 63 and movable locking apparatus 720 to slip in the axial rotation domain, when rotated in one direction, for example within fixed locking apparatus 63 rotates counter clockwise, and to not slip, but to interface rigidly in the axial rotation domain, when rotated in the other direction, for example when fixed locking apparatus 63 rotates clockwise. As a result, turbine shaft 73 may be permitted to rotate in a first direction, for example, counter clockwise, but prevented from rotating in a second direction, for example clockwise, whenever movable locking apparatus 720 is mechanically interfaced with fixed locking apparatus 63.

In various embodiments, as movable locking apparatus 720 mechanically engages with fixed locking apparatus 63, fixed locking apparatus 63 may conduct rotational force from turbine shaft 73, into movable locking apparatus 720 and movable locking apparatus 720 may conduct rotational force into rocker arm 700. Rocker arm 700 may conduct this force into main body 13 and away from interlocking piston 49.

In various embodiments, a shaft interlock system 400 may have a disengaged state and an engaged state. With reference to FIG. 7, a shaft interlock system 400 is illustrated in the engaged state. A movable locking apparatus 720 is interfaced in mechanical communication with fixed locking apparatus 63. Interlocking piston 49 is in a fully-extended position, wherein the interlocking piston is translated to its farthest position in the negative Y axis direction. In this state, the force exerted by retraction actuator 37 is overcome by the force exerted by extension actuator 23. For example, no oil or oil having insufficient hydraulic pressure to impel interlocking piston 42 to retract, is introduced into retraction actuator 37.

Moreover, the shaft interlock system 400 may enter a disengaged state. In this state, the force exerted by retraction actuator 37 overcomes the force exerted by extension actuator 23. For example, oil having sufficient hydraulic pressure to impel interlocking piston 42 to retract is introduced into retraction actuator 37. Extension actuator 23 may comprise a spring, thus maintaining a force in the positive X direction on interlocking piston 49; however, as long as sufficiently pressurized oil is introduced into retraction actuator 37, this spring force may be overcome. In various embodiments, extension actuator 23 exerts 30 to 70 lbs. (~133 to ~312 N), for example, 50 lbs. (~223 N) of force on interlocking piston 49. In various embodiments, retraction actuator 37 exerts 130 to 170 lbs. (~578 N to ~757 N), for example, 150 lbs. (~668 N) of force on interlocking piston 49. However, any force may be selected wherein the force exerted by extension actuator 23 is less than the force exerted by retraction actuator 37 when sufficient pressurized oil is introduced into retraction actuator 37. In this manner, if the oil supply fails, for example, upon turbine shutdown, the interlocking piston 49 extends so that movable locking apparatus 720 engages fixed locking apparatus 63 and rotation of the shaft is prevented in one direction and allowed in the other direction.

In various embodiments, main body 13 further comprises an extension stop 305, though main body 13 may comprise any number of extension stops 301 adapted to limit the travel of interlocking piston 49. Extension stop 305 comprises a ledge disposed within the cylinder 33 of main body 13 in which interlocking piston 49 travels. In this manner, the maximal extension of the interlocking piston 49 may be set, and thus the maximal approach of movable locking apparatus 720 to fixed locking apparatus 63 may be established. In various embodiments, the position of extension stop 305 is selected to prevent movable locking apparatus 720 from extending in the negative Y direction to ride against fixed locking apparatus 63. In this manner, movable locking apparatus 720 may only contact fixed locking apparatus 63 when a tooth section of fixed locking apparatus 63 interferes with movable locking apparatus 720, for example, though rotation. In this manner, when turbine shaft 73 (and thus fixed locking apparatus 63) is rotating in the direction that rotation is desired to be permitted, even if interlocking piston 49 is in its fully-extended position, rocker arm 700 does not continuously contact fixed locking apparatus 63.

In various embodiments, main body 13 further comprises a retraction stop 306, though main body 13 may comprise any number of retraction stops 302 adapted to limit the travel of interlocking piston 49. Retraction stop 306 comprises a ledge disposed within the cylinder 33 of main body 13 in which interlocking piston 49 travels. In this manner, the maximal retraction of the interlocking piston 49 may be set, and thus the maximal retraction of interlocking piston 49 into the main body may be established. In this regard, wear on the extension actuator 23 may be ameliorated by limiting the force transferred to extension actuator 23 when interlocking piston 49 is in the fully-retracted position.

In various embodiments, main body 13 further comprises a cap 307. In various embodiments, cap 307 is a removable cap enclosing the cylinder 33 of main body 13 in which interlocking piston 49 resides. Cap 307 may be removable, for example, to replace components of extension actuator 23. Moreover, cap 307 may comprise a vent 308. Vent 308 may provide a release mechanism for oil introduced into retraction actuator 37. In this regard, overpressure situations may be ameliorated through the venting of hydraulic pressure from retraction actuator 37.

Now, having described various components of shaft interlock systems and with reference to FIGS. 1-5, a shaft interlock system 200 may be used according to various methods. For example, a retraction actuator 31 disposed within a main body 11 of a shaft interlock system 200 may actuate wherein oil or other fluid may be pressurized to flow through oil channel 32 and fill a cylinder 33 in a main body 11, and an interlocking piston 41 may be translated so that the shaft interlock system enters a disengaged state. The retraction actuator 31 may maintain a force on the interlocking piston 41 greater than a corresponding force exerted by an extension actuator 21. A turbine shaft 71 comprising a fixed locking apparatus 61 may rotate in at least one of a clockwise and a counterclockwise direction. The oil or other fluid may be depressurized and the extension actuator 21 force exerted by the retraction actuator 31 may diminish so that the retraction actuator 31 exerts a force on the interlocking piston 41 greater than that exerted by the retraction actuator 31, so that the interlocking piston 41 is caused to translate toward a turbine shaft 71 comprising a fixed locking apparatus 61. The translating causes a movable locking apparatus 51 to mechanically interface with a fixed locking apparatus 61. The turbine shaft 71 rotates in a counter clockwise direction, or otherwise in a desired direction of rotation, and the movable locking apparatus 51 does not prevent the turbine shaft 71 from rotating. The turbine shaft 71 rotates in a clockwise direction, or otherwise in a undesired direction of rotation and the movable locking apparatus 51 prevents the turbine shaft from rotating.

Now, having described various components of shaft interlock systems, and with reference to FIG. 6, a shaft interlock system 300 may be used according to various methods. For example, a retraction actuator 34 disposed within a main body 12 of a shaft interlock system 300 may actuate wherein oil or other fluid may be pressurized to flow through an oil channel 35 and fill a cylinder 36 in a main body 12, and an interlocking piston 45 may be translated so that the shaft interlock system 300 enters a disengaged state. The retraction actuator 34 may maintain a force on the interlocking piston 45 greater than a corresponding force exerted by an extension actuator 22. A turbine shaft 72 comprising a fixed locking apparatus 62 may rotate in at least one of a clockwise and a counterclockwise direction. The oil or other fluid may be depressurized and the extension actuator 22 force exerted by the retraction actuator 34 may diminish so that the retraction actuator 34 exerts a force on the interlocking piston 42 greater than that exerted by the retraction actuator 34, so that the interlocking piston 42 is caused to translate toward a turbine shaft 72 comprising a fixed locking apparatus 62. The translating causes a movable locking apparatus 52 to mechanically interface with a fixed locking apparatus 62. The turbine shaft 72 rotates in a counter clockwise direction, or otherwise in a desired direction of rotation, and the movable locking apparatus 52 does not prevent the turbine shaft 72 from rotating. The turbine shaft 72 rotates in a clockwise direction, or otherwise in a undesired direction of rotation and the movable locking apparatus 52 prevents the turbine shaft from rotating.

Now, having described various components of shaft interlock systems, and with reference to FIG. 7, a shaft interlock system 400 may be used according to various methods. For example, a retraction actuator 37 disposed within a main body 13 of a shaft interlock system 400 may actuate wherein oil or other fluid may be pressurized to flow through an oil channel 38 and till a cylinder 39 in a main body 13, and an interlocking piston 49 may be translated so that the shaft interlock system 400 enters a disengaged state. The retraction actuator 37 may maintain a force on the interlocking piston 49 greater than a corresponding force exerted by an extension actuator 23. A turbine shaft 73 comprising a fixed locking apparatus 63 may rotate in at least one of a clockwise and a counterclockwise direction. The oil or other fluid may be depressurized and the extension actuator 23 force exerted by the retraction actuator 37 may diminish so that the retraction actuator 37 exerts a force on the interlocking piston 42 greater than that exerted by the retraction actuator 37, so that the interlocking piston 42 is caused to translate toward a turbine shaft 73 comprising a fixed locking apparatus 63. The translating causes a rocker arm 700 a movable locking apparatus 720 to mechanically interface with a fixed locking apparatus 63. The turbine shaft 73 rotates in a counter clockwise direction, or otherwise in a desired direction of rotation, and the movable locking apparatus 720 does not prevent the turbine shaft 73 from rotating. The turbine shaft 73 rotates in a clockwise direction, or otherwise in a undesired direction of rotation and the movable locking apparatus 720 prevents the turbine shaft from rotating.

Now, having described various components of shaft interlock systems and methods of using shaft interlock systems, various components of shaft interlock systems may be manufactured from various materials. In various embodiments, various components of shaft interlock systems (e.g., the interlocking piston) may comprise a austenitic nickel-chromium-based alloy such as Inconel® which is available from Special Metals Corporation of New Hartford, N.Y., USA, or any other high-temperature tolerant material, for example, titanium. However, in further embodiments, various components of shaft interlock systems may comprise other metals, such as tungsten, aluminum, steel, or alloys, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of shaft interlock systems as disclosed herein are made of different materials or combinations of materials, and/or may comprise coatings.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(t), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shaft interlock system comprising:
   an interlocking piston configured to translate a movable locking apparatus comprising a castellated ring configured to interface with a fixed locking apparatus of a turbine shaft, the fixed locking apparatus comprising a series of teeth disposed circumferentially about an end of the turbine shaft and extending radially from a circumference of the turbine shaft;
   a main body wherein the interlocking piston is at least partially disposed;
   an extension actuator disposed in the main body and in mechanical communication with the interlocking piston capable of exerting an extending force on the interlocking piston; and
   a retraction actuator disposed in the main body and in mechanical communication with the interlocking piston capable of exerting a retracting force on the interlocking piston, wherein the interlocking piston is configured to retract in response to the retraction actuator exerting the retraction force on the interlocking piston,
   wherein the movable locking apparatus is configured to engage the fixed locking apparatus to permit the fixed locking apparatus and the movable locking apparatus to slip in the axial rotation domain in a first direction of rotation and preventing the fixed locking apparatus and the movable locking apparatus from slipping in the axial rotation domain in a second direction of rotation.

2. The shaft interlock system of claim 1, further comprising a cooling wand extending axially into a hollow channel of the turbine shaft.

3. The shaft interlock system of claim 1, wherein the extension actuator comprises a compressed helical spring.

4. The shaft interlock system of claim 1, wherein the retraction actuator comprises an oil channel configured to conduct into a cylinder within the main body and therein may exert a hydraulic force on the interlocking piston.

5. The shaft interlock system of claim 1, wherein the interlocking piston comprises:
   a shaft; and
   a pressure plate disposed at the end of the shaft and within the main body.

6. The shaft interlock system of claim 1, wherein the interlocking piston further comprises an anti-rotation tab.

7. A shaft interlock system comprising:
   an interlocking piston configured to translate a movable locking apparatus configured to interface with a turbine shaft comprising a fixed locking apparatus;
   a main body wherein the interlocking piston is at least partially disposed;
   an extension actuator disposed in the main body and in mechanical communication with the interlocking piston capable of exerting an extending force on the interlocking piston;
   a retraction actuator disposed in the main body and in mechanical communication with the interlocking piston capable of exerting a retracting force on the interlocking piston, wherein the interlocking piston is configured to retract in response to the retraction actuator exerting the retraction force on the interlocking piston,
   wherein the movable locking apparatus is configured to engage the fixed locking apparatus to permit the fixed locking apparatus and the movable locking apparatus to slip in the axial rotation domain in a first direction of rotation and preventing the fixed locking apparatus and the movable locking apparatus from slipping in the axial rotation domain in a second direction of rotation; and
   wherein the movable locking apparatus comprises an integral tip of the interlocking piston having a chamfered circumferential edge and extending radially into a plane of rotation through which the fixed locking apparatus rotates.

8. The shaft interlock system of claim 7, wherein the main body comprises an extension stop comprising a ledge disposed within a cylinder of the main body whereby a maximal extension of the interlocking piston is established.

9. The shaft interlock system of claim 7, wherein the main body comprises a retraction stop comprising a ledge disposed within a cylinder of the main body whereby a maximal retraction of the interlocking piston is established.

10. The shaft interlock system of claim 7, wherein the interlocking piston translates a rocker arm, wherein the rocker arm comprises the movable locking apparatus.

11. The shaft interlock system of claim 7, wherein the interlocking piston comprises the movable locking apparatus.

12. The shaft interlock system of claim 7, wherein the interlocking piston is configured to retract to disengage from the fixed locking apparatus in response to the retraction actuator exerting the retraction force on the interlocking piston.

\* \* \* \* \*